United States Patent [19]

Greenley et al.

[11] Patent Number: 5,208,057
[45] Date of Patent: May 4, 1993

[54] PROCESS FOR BUTCHERING AND DISINFECTING FOWL

[75] Inventors: David E. Greenley, Blue Bell; Adam Chi-Tung Hsu, Lansdale; Barry C. Lange, both of Lansdale; Eilenn F. Warwick, Lansdale, all of Pa.; Samuel E. Sherba, Willingboro, N.J.; John S. Chapman, Ambler, Pa.

[73] Assignee: Rohm and Haas Company, Philadelphia, Pa.

[21] Appl. No.: 790,047

[22] Filed: Nov. 12, 1991

[51] Int. Cl.$^5$ .................... A23B 4/18; A23L 1/315
[52] U.S. Cl. ................... 426/332; 424/723; 426/335; 426/532; 426/644
[58] Field of Search ............ 452/78; 426/644, 332, 426/335, 532; 424/723

[56] References Cited

U.S. PATENT DOCUMENTS 4,667,370 5/1987 Brockington et al.
4,766,646 8/1988 Parker.
4,872,999 10/1989 Schild et al.

OTHER PUBLICATIONS

Sheldon et al., Efficacy of Ozone as a Disinfectant for Poultry Carcasses and Chill Water, Journal of Food Science, vol. 51, No. 2, 1986.
Morrison, et al., Reduction of Salmonella on Chicken Carcasses by Immersion Treatments, Journal of Food Protection, vol. 48, Nov. 1985.
Bailey, et al., Contamination of Poultry during Processing, The Microbiology of Poultry Meat Products, Chap. 5, pp. 193, et seq.
Bailey, et al., Chlorine Spray Washing to Reduce Bacterial Contamination of Poultry Processing Equipment, 1986 Poultry Science 65:1120–1123.
Cunningham, Methods of Preservation of Poultry Products, The Microbiology of Poultry Meat Products, Copyright 1987 by Academic Press Inc., pp. 275, et seq.
Sofos, Antimicrobial Activity and Functionality of Reduced Sodium Chloride and Potassium Sorbate in Uncured Poultry Products, Journal of Food Science, vol. 51, No. 1, 1986, p. 16.
Smith, et al., Potential Uses of Combined Halogen Disinfectants in Poultry Processing, 1990 Poultry Science 69:1590–1594.
Williams, et al., Research Note: Combined Halogen Disinfectants in Poultry Processing, 1990 Poultry Science 69:2248–2251.
Alleman, et al., 54 Comparative Evaluation of Alternative Halogen-Based Disinfection Strategies, 42nd Purdue University Industrial Waste Conference Proceedings, p. 519.
Sergent, Enhanced Water Management Using Bromine Chemistry, presented at the 1986 Cooling Tower Institute Annual Meeting, Houston, TX, Jan. 27–29, 1988 as Technical Paper No. TP-86-9.
Cooper, et al., Bromide-Oxidant Interactions and THM Formation: A Literature Review, Management and Operations, Journal AWWA, p. 116.

Primary Examiner—Arthur L. Corbin
Attorney, Agent, or Firm—Michael B. Fein

[57] ABSTRACT

A process for butchering fowl which comprises a step wherein said fowl is treated with water comprising introducing an effective amount of a bromide (for example, KBr, NH4Br, or NaBr) and an oxidant into said water to control microorganisms. The process is especially suitable for poultry such as chicken and turkey.

14 Claims, No Drawings

PROCESS FOR BUTCHERING AND DISINFECTING FOWL

I. BACKGROUND OF THE INVENTION

A. Field of the Invention

This invention relates to the field of control of microorganisms in the butchering of fowl.

B. Description of the Prior Art

Ozone has been suggested as an antimicrobial in poultry chiller water by Shelton, et al., *Efficacy of Ozone as a Disinfectant for Poultry Carcasses and Chill Water*, Journal of Food Science, Volume 51, No. 2, 1986.

Use of 60° C. water and 200 ppm chlorine or 2.5% potassium sorbate were suggested to control Salmonella in chicken by Morrison, et al., *Reduction of Salmonella on Chicken Carcasses by Immersion Treatments*, Journal of Food Protection, Vol, 48, November 1985.

Chlorination of poultry spray washer or chiller tank water was discussed in Bailey, et al., *Contamination of Poultry during Processing*, The Microbiology of Poultry Meat Products, Chapter 5, pp. 193, et. seq. and *Chlorine Spray Washing to Reduce Bacterial Contamination of Poultry Processing Equipment*, 1986 Poultry Science 65:1120-1123.

The state of the art in the field of preservation of poultry products was described by Cunningham, *Methods of Preservation of Poultry Products*, The Microbiology of Poultry Meat Products, Copyright 1987 by Academic Press Inc., pp. 275, et. seq.

The use of an acid polyformate salt to eliminate Salmonella during poultry processing was patented by Parker, U.S. Pat. No. 4,766,646.

The use of salt water, antimicrobials, and antioxidants in poultry processing are described by Brockington, et al., in U.S. Pat. No. 4,667,370.

Sodium chloride and potassium sorbate were used to control microbial growth in poultry by Sofos, *Antimicrobial Activity and Functionality of Reduced Sodium Chloride and Potassium Sorbate in Uncured Poultry Products*, Journal of Food Science, Volume 51, No. 1, 1986, p. 16.

Organic N-halamines of the classes oxazolidinones and imidazolidones were shown to be useful as poultry processing antimicrobials by Smith, et al., *Potential Uses of Combined Halogen Disinfectants in Poultry Processing*, 1990 Poultry Science 69:1590-1594 and Williams, et al., *Research Note: Combined Halogen Disinfectants in Poultry Processing*, 1990 Poultry Science 69:2248-2251.

Except for the aforementioned organic N-halamines, the use of bromine chemistry has not been suggested for poultry processing antimicrobials.

Bromine chemistry is a very well known alternative to chlorine chemistry in other fields, e.g., industrial (i.e., cooling towers, condensers, etc.) and municipal systems (wastewater, etc.). Sodium bromide supplementation of chlorine and bromochlorodimethylhydantoin (BCDMH) were studied by Alleman, et al., 54 *Comparative Evaluation of Alternative Halogen-Based Disinfection Strategies*, 42nd Purdue University Industrial Waste Conference Proceedings, pp. 519, and Sergent, *Enhanced Water Management Using Bromine Chemistry*, presented at the 1986 Cooling Tower Institute Annual Meeting, Houston, Tex., Jan. 27-29, 1988 as Technical Paper Number TP-86-9.

Combinations of chlorine-bromide, chlorine dioxide-bromide, and monochloramine-bromide were studied as reported by Cooper, et al., *Bromide-Oxidant Interactions and THM Formation: A Literature Review, Management and Operations*, Journal AWWA, pp. 116, but again, no suggestion regarding poultry processing was made.

Finally, the use of hypobromous acid formed from bromine replacement of hypochlorous acid was patented by Schlid, et al., U.S. Pat. No. 4,872,999, for removal of mussels and barnacles from salt or brackish water.

Cost is a major factor in the fowl butchering industry. In the poultry processing industry, about 200 to 400 ppm of chlorine is most typically used in the chill tank to prevent cross contamination and to extend the shelf life of the butchered poultry, as described by Cunningham, supra. Chlorine has certain disadvantages and limitations, however. For example, the amount which can be practically used is limited by chlorine's affect on the carcass. Another limitation is the need to limit the amount of chlorine in the effluent due to adverse environmental affect on groundwater and the like.

Other processes which have been suggested, for example the use of N-halamines by Smith, et al, and Williams, et al, supra, have disadvantages in that they are relatively expensive and are thus considered inefficient in the industry.

II. SUMMARY OF THE INVENTION

It is an object of the present invention to provide a fowl butchering process which allows for a dramatic reduction in the amount of chlorine disinfectant used or elimination of chlorine entirely. Another object is to provide a very efficient and effective method of disinfection in the fowl butchering process.

These objects, and others which will become apparent from the following disclosure, are achieved by the present invention which comprises in one aspect a process for butchering fowl comprising introducing an effective amount of a bromide and an oxidant to control microorganisms in at least one water treatment step in the process.

III. DETAILED DESCRIPTION OF THE INVENTION AND THE PRIOR ART

Fowl butchering processes generally comprise one or more water treatment steps. Typically such processes include both a scald tank or step and a chill tank or step. We conceive of use of a bromide and an oxidant being introduced in either or both of these steps, or in any other steps which utilize water, as antimicrobials in effective amounts to control Salmonella and other undesirable microorganisms.

The preferred oxidants are selected from the group consisting of chlorine, hydrogen peroxide, sodium hypochlorite, sodium persulfate, sodium perborate, potassium persulfate, sodium permanganate, potassium permanganate, chlorine dioxide, peracetic acid, and ozone and organic peroxides such as t-butyl hydroperoxide.

The preferred bromides are selected from KBr, NH$_4$Br, and NaBr. CaBr$_2$ is also suitable. Sodium bromide is most preferred because of its availability.

The preferred concentration of bromide and oxidant is such as to achieve residual bromine levels of about 0.1 to 20 ppm, preferably about 0.3 to 5 ppm, measured about five minutes after treatment. The bromide and oxidant are introduced in a molar ratio of about 0.08 to 2.0 of bromide to oxidant, preferably about 0.1 to 1.0.

The types and effective amounts of bromide and oxidant used will depend upon the type of and quality of birds to be treated and the temperature and composition, of the water where they are being introduced.

One or more active bromine species are generated in situ according to this invention. In the case of NaBr and KBr, the active bromine species is HOBr.

The bromide and oxidant of the present invention will be effective even in the presence of amines which had hitherto adversely affected the previously used techniques. Also, microorganisms are substantially eliminated in the water and in the fowl by this process.

EXAMPLES

The following examples illustrate a few embodiments of the invention. It is to be understood that these examples are for purpose of illustration only and should not be considered as limiting.

EXAMPLE 1

In a poultry processing plant operating continuously around the clock in which about 20 μg/ml chlorine has been used in the water in each chiller to successfully reduce the number of microorganisms (such as Salmonella) on the carcasses as they go through the chillers, a bromide is used to replace one half of the chlorine, on a molar basis, in the following example.

A. Calculate the moles of chlorine being applied to the chiller water. For example, for every 1000 gallons of water treated at 20 μg/ml of chlorine, 1068 moles or 75.7 kg of $Cl_2$ are used.

[(1000 gal)(3785 ml/gal)(20 μl/ml $Cl_2$)(1 μmole/70.9 μg $Cl_2$)(1 mole/1000 μmole)=1068 moles or 75.7 kg of chlorine.]

B. Calculate the weight of sodium bromide needed to apply a 1:1 molar ratio of sodium bromide to chlorine. For example, 1068 moles of sodium bromide is 110 kg of sodium bromide or 290 kg of a 38% aqueous solution of sodium bromide.

[(1068 moles NaBr)(102.9 g/mole)(1 kg/1000 g)]

C. Apply 75.7 kg of chlorine and 110 kg of sodium bromide per 1000 gallons of chiller water, preferably by pre-mixing the chlorine and sodium bromide in deionized or tap water.

D. Depending on the pH of the chiller water and the levels of organics, especially amines, present in the water, active bromine can be effective at a lower level than chlorine. Monitor the performance of the total bromine replacement (as calculated above) by regularly determining residual oxidant levels in the chiller water, and microorganism levels in the chiller water and on carcasses. Once a baseline performance is established, maintain the 1:1 molar ratio of sodium bromide to chlorine and gradually reduce the overall levels of sodium bromide and chlorine applied to the chiller water until further reduction results in detection of unacceptable levels of microorganism. Return to the lowest sodium bromide and chlorine level which provides the desired residual oxidant and microorganism levels.

EXAMPLE 2

This example illustrates partial replacement of chlorine with active bromine.

A. In the same poultry processing plant as the preceeding example, replace about 25% (on a molar basis) of the chlorine with active bromine. If 20 μg/ml $Cl_2$ (0.28 μmole/ml) is being used in the chiller water, treat the chiller water with 20 μg/ml $Cl_2$ and 7.2 μg/ml sodium bromide (0.07 μmole/ml). Preferably, the chlorine and sodium bromide are premixed in deionized or tap water to preform HOBr prior to application to the chiller water.

B. Monitor the performance of the chlorine/bromine mixture by regularly determining residual oxidant levels in the chiller water, and microorganism levels in the chiller water and on carcasses. Once a baseline performance has been established, reduce the chlorine level by about 10–25%.

C. Monitor the performance of the new chlorine/bromine mixture as in B. above. If the performance continues to be acceptable, reduce the chlorine level once more by about 10–25%. Continue this process until a further chlorine reduction results in detection of unacceptable levels of microorganism.

D. Return to the lowest chlorine level that provided adequate control of microorganism levels.

While the present invention has been described in considerable detail, various modifications and alternatives should become readily apparent to those skilled in the art without departing from the spirit and scope of the invention as set forth in the following claims.

We claim:

1. In a process for butchering fowl which comprises a step wherein said fowl is treated with water, the improvement comprising introducing a bromide and an oxidant into said water in an amount effective to control Salmonella and other undesirable microorganisms.

2. Process according to claim 1 wherein an active bromine species is generated in situ in said water from the reaction of said bromide and said oxidant.

3. Process according to claim 2 wherein said active bromine species is HOBr.

4. Process according to claim 1 wherein said oxidant is selected from the group consisting of chlorine, hydrogen peroxide, sodium hypochlorite, sodium persulfate, potassium persulfate, sodium perborate, sodium permanganate, potassium permanganate, chlorine dioxide, peracetic acid, ozone, and t-butyl hydroperoxide.

5. Process according to claim 1 wherein said bromide and said oxidant are introduced into said water in a chill tank.

6. Process according to claim 1 wherein said bromide and said oxidant are introduced into said water in a scald tank.

7. Process according to claim 1 wherein said bromide and said oxidant are introduced in a molar ratio of about 0.08 to 2.0 of bromide to oxidant.

8. Process according to claim 7 wherein said molar ratio is about 0.1 to 1.0.

9. Process according to claim 1 wherein said fowl is selected from the group consisting of chicken and turkey.

10. Process according to claim 1 wherein an amount of residual bromine is generated in situ in said water so as to have a residual bromine level of about 0.1 to 20 ppm based on water measured about 5 minutes after introducing said bromide and said oxidant.

11. Process according to claim 10 wherein said residual bromine level is about 0.3 to 5 ppm.

12. Process according to claim 1 wherein said bromide is selected from the group consisting of KBr, $NH_4Br$, and NaBr.

13. Process according to claim 1 wherein one or more active bromine species are generated in situ.

14. Process according to claim 13 wherein one of said active bromine species is HOBr.

* * * * *